Aug. 14, 1934.  W. T. HONISS  1,970,094
MEANS FOR AND METHOD OF CONTROLLING THE TEMPERATURE
AND CONDITION OF MOLTEN GLASS IN FOREHEARTHS
Filed Jan. 25, 1930  3 Sheets-Sheet 2

Witness:
G. O. Duberg.

Inventor;
William T. Honiss
by Brown & Parham
Attorneys.

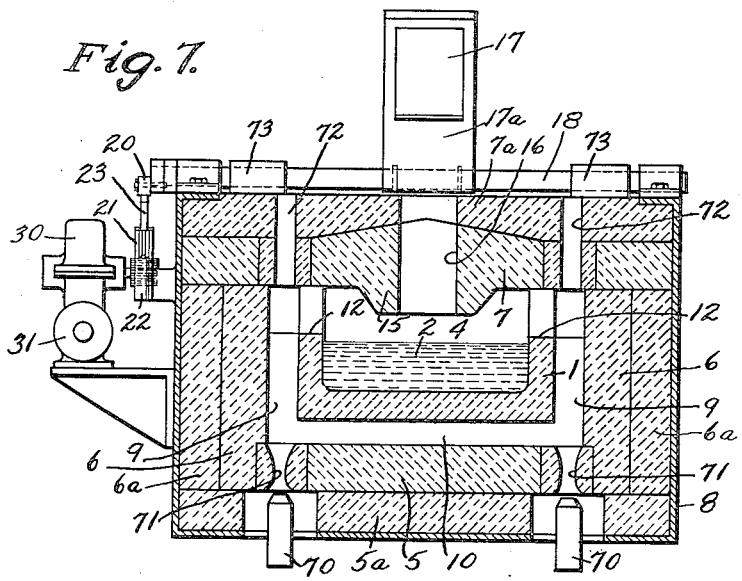

Patented Aug. 14, 1934

1,970,094

UNITED STATES PATENT OFFICE 1,970,094

MEANS FOR AND METHOD OF CONTROLLING THE TEMPERATURE AND CONDITION OF MOLTEN GLASS IN FOREHEARTHS

William T. Honiss, West Hartford, Conn., assignor to Hartford-Empire Company, Hartford, Conn., a corporation of Delaware Application January 25, 1930, Serial No. 423,377

17 Claims. (Cl. 49—55)

This invention relates generally to forehearths or refractory passages for conducting molten glass from a melting tank to a place at which glass is fed, gathered, drawn or otherwise removed.

The invention relates more particularly to the control of the temperature and condition of the glass in the forehearth or glass flow passage and at the glass delivery point.

It is usual to conduct molten glass in a stream along a refractory channel of a forehearth or extension of a melting tank to a glass delivery outlet, drawing opening or gathering station at the outer end of such channel. The glass entering such forehearth from the tank usually is at a temperature higher than that desired for the glass at the delivery point. However, heat from such glass usually is dissipated by radiation through the glass conducting walls or is drawn off or permitted to escape from the glass above the forehearth so that local heating of the glass in the forehearth may be and usually is required in order that the glass at the delivery point may have a desirably high temperature. It also is well known that the glass in a forehearth tends to flow more rapidly along the longitudinal median line of the flow channel and to lag behind and become colder at the sides and bottom of the glass conducting channel. This condition is known as "channeling" and is objectionable in that it prevents desirable uniformity of temperature and condition of the glass at the delivery point.

It has been proposed to obviate "channeling" by locally heating or diverting a relatively large part of the flow of heated gases from the furnace or from local sources of heat to the glass in the side portions of the channel and to effect local cooling or relatively less heating of the glass at the longitudinal median portion of the forehearth. It also has been proposed to apply heat locally to the glass at the delivery end of the forehearth. These and similar proposals have been beneficial but fall short of completely solving all problems relating to the control of the temperature and condition of glass in a forehearth or flow passage and particularly at the place of delivery of glass therefrom.

An object of the present invention is to provide improved means for and methods of controlling not only the temperature of the glass at the delivery point but the temperature of the glass flowing along the forehearth, in accordance with any departure from the desired temperature at the place of delivery, whereby a quickly effective corrective adjustment of temperature will be made at the place of delivery and more slowly acting corrective adjustments of the temperature of the glass as it flows from the tank along the forehearth will be made progressively so that such glass will reach the delivery point at the temperature and in the condition desired.

A further object of the invention is to provide means for and methods of obviating "channeling" in the glass in the forehearth by preventing any appreciable dissipation of heat from the bottom and sides of the stream through the glass conducting channel and by regulably controlling the amount of heat radiation from the glass at the longitudinal median portion of the stream without varying the viscosity or friction of the glass as it flows along the side walls and bottom of the forehearth channel.

A further object of the invention is the provision of temperature control means for a glass conducting forehearth that will act automatically to adjust the temperature regulating conditions near the delivery point in response to changes of the temperature of the glass at such point and at the same time will act to adjust the amount of radiation permitted from such glass as it flows from the melting tank along the forehearth channel toward the delivery point.

A further object of the invention is to provide an automatic means which will act in response to a departure from a desirable temperature of the glass at the delivery point to quickly produce a corrective adjustment of temperature of the glass at such delivery point and to simultaneously initiate a series of progressive adjustments of temperature of the glass flowing from the source of supply toward the delivery point.

A still further object of the invention is to provide for automatically controlled adjustment of the amount of heat permitted to radiate from the glass in the forehearth channel in accordance with the temperature conditions of the glass at the delivery point and so that a minimum of disturbance of the glass at the delivery point will be caused by the thermal change in glass in the forehearth channel, a relatively long time being permitted after cooling of the glass by radiation for reheating and homogenizing of such glass before it reaches the delivery point.

Further objects and advantages of the invention will become apparent from a consideration of the following specification, when it is considered in conjunction with the accompanying drawings, in which:

Fig. 5 is a plan view of a novel heat applying hood for surrounding the glass issuing from the delivery outlet of the forehearth structure of the preceding views;

Fig. 6 is a fragmentary detail of the operating means for a shutter or shield for controlling radiation of heat through an opening in the top of the forehearth structure; and Fig. 7 is a view similar to Fig. 3 but showing the use of burners instead of electrical heating elements in effecting the control of the temperature of the glass in the forehearth channel.

Generally described, the invention contemplates the provision of a heat confining jacket for the glass conducting channel of the forehearth and the introduction into such jacket of an adjustable amount of heat, adequate to prevent any appreciable dissipation of heat from the glass through the walls of the glass conducting channel and preferably sufficient to cause a slight application of heat to such glass. The lowering of the temperature of the glass and the control of such temperature as the glass passes from the tank to the place of delivery then are effected by controlled radiation of heat or cooling, preferably through one or more of a series of openings which are spaced longitudinally of the forehearth channel above the longitudinal median portion of the glass therein. In order to preclude disturbance of the glass at the delivery point by the thermal change in the glass in the forehearth channel and to permit the glass from which heat has been radiated to reheat more or less to provide desirable homogeneity of temperature, viscosity and condition throughout the cross section of the glass conducting channel, the initial and greatest cooling by radiation preferably is through the opening most remote from the delivery point. The remaining radiation openings may be opened progressively toward the delivery point if required and the amount of opening of these respective radiation openings may be varied according to the distance thereof from the delivery point and according to the amount of correction of temperature that is to be made in the glass.

The invention also provides means for applying heat to the space surrounding the glass delivery point so as to prevent any appreciable dissipation of heat from the glass at that point when such glass is about the temperature desired and to apply heat to such glass when the glass is at a lower temperature. This local temperature control thus will serve to correct quickly the temperature of glass at the delivery point so that loss of glassware because of continued feeding or delivery of glass of improper temperature and condition is kept at a minimum. Moreover, the invention provides means acting automatically on a departure from the desired temperature in the glass at the delivery point to initiate progressive operation of the aforesaid heat radiation control shutters or shields so that the temperature and condition of the glass flowing along the channel toward the delivery point will be corrected before such point has been reached.

Figure 2:
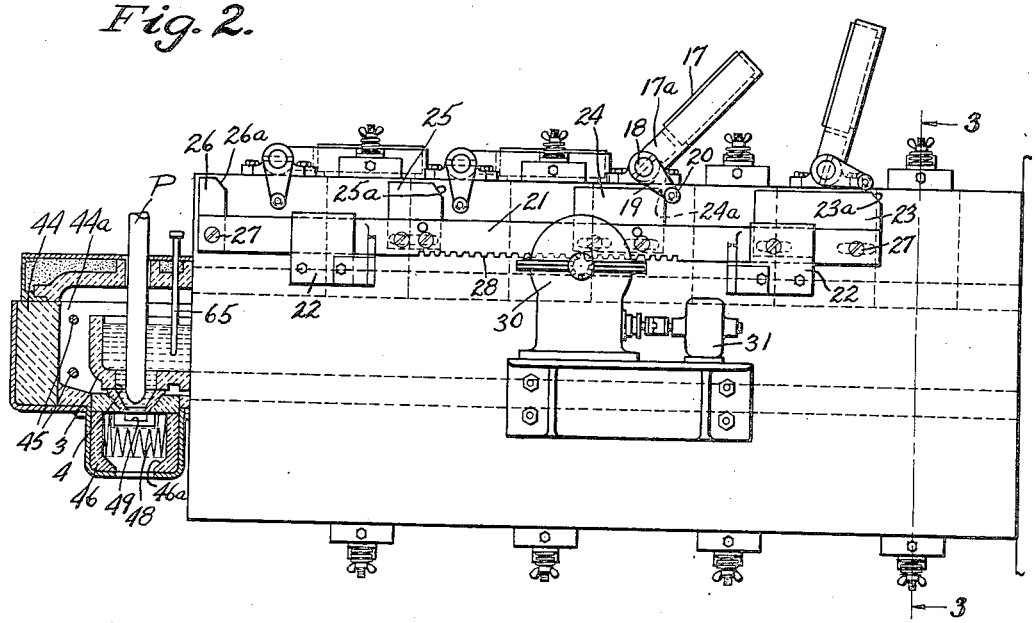
Fig. 2 is a view of the forehearth and associate control means, the view being mainly in side elevation with the outer or delivery end portion of the forehearth shown in vertical section, and with the wiring connections and certain conventional parts of the structure of Fig. 1 omitted.
Figures 3, 4:
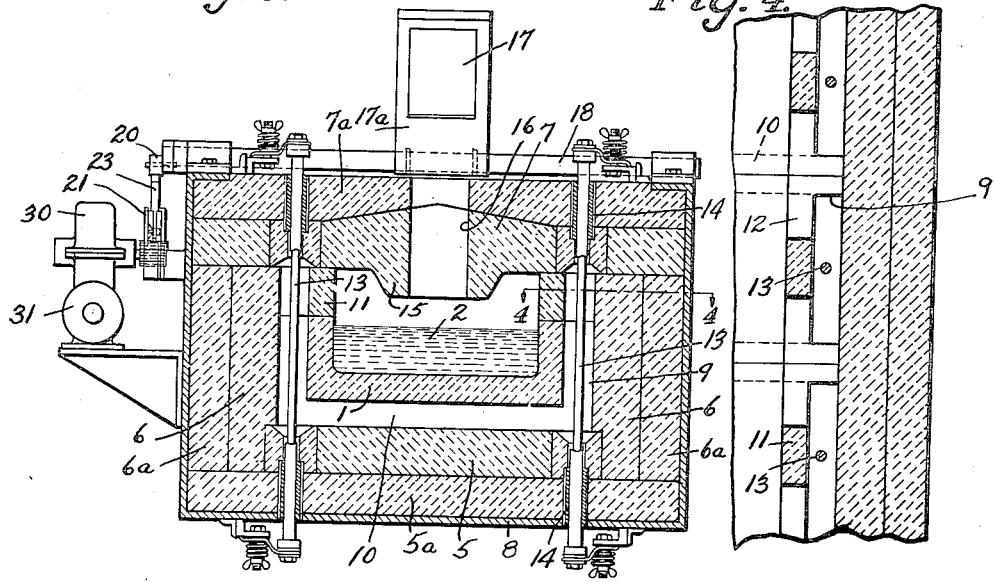
Fig. 3 is a transverse vertical section through the forehearth, the view being taken substantially along the line 3—3 of Fig. 2.
Fig. 4 is a fragmentary horizontal section of part of a side wall structure of the forehearth, the view being taken substantially along the line 4—4 of Fig. 3.

Referring now more particularly to the drawings, the numeral 1 designates a refractory channel in which molten glass 2 (Figs. 3 and 7) may flow from a melting tank, not shown, or like source of supply to a delivery point in the outer end portion 3, Fig. 2, of such channel. The delivery portion 3 of the glass conducting channel is shown as being a feed spout having an outlet 4 in its bottom for the discharge of glass under the control of an implement P for the production of mold charges from which articles of glassware are to be fabricated. It will be understood, however, that the glass delivery portion 3 of the channel may be formed for the gathering of molten glass by any suitable means, as by suction, or for the drawing of molten glass.

The glass conducting channel 1 is surrounded by a jacket comprising the refractory bottom wall 5, refractory side walls 6 and a refractory top wall 7. These refractory jacket members may be covered by other refractory members having relatively high heat insulating properties, as indicated at 5a, 6a, and 7a, respectively, or granular or other suitable known heat insulating material may be employed, the whole being confined if desired in a metallic casing 8 that may be constructed and supported in any suitable known manner, no supporting means being shown. The glass conducting channel 1 is spaced from the sides and bottom of the heat confining jacket by the side spacing and positioning members 9 and by the bottom spacing and supporting members 10. These spacing members preferably are portions of flanges which are formed integrally with the longitudinal sections of the channel 1 at the ends of such sections so that the joints between such sections will extend completely to the walls of the jacket, whereby such glass as may penetrate these joints will not flow through the joints into the space within the heat confining jacket. The top member 7 of the jacket serves also as the cover for the channel 1, the upper edges of the channel sections proper being spaced from such cover member and the latter being partially suppported on the channel 1 by means of longitudinally spaced blocks 11 which are disposed on the side members of the channel 1 between the latter and the cover member 7. The spaces between adjacent blocks 11 provide inlet ports 12 and through which heat from the space between the jacket and the channel 1 may pass into the space above the glass in such channel.

The invention may provide any suitable means for introducing heat into the space between the jacket and the channel 1. Preferably, vertically disposed electrical heating elements adapted for use at high temperatures, such as indicated at 13, are mounted in vertically aligned openings 14 in the top and bottom portions of the heat confining jacket and insulating structure so that such heating elements depend vertically through the side spaces between the channel 1 and the side walls of the heat confining jacket. Since the flanges at the joints between sections of the channel 1 extend to the inner walls of the heat confining jacket, it is obvious that by providing heating elements in the practically separate compartments thus formed between adjacent flange portions 9, differential heating effects may be produced and independently controlled at different places along the length of the channel 1. The heating elements 13 preferably are out of line transversely of the channel with the ports 12 so that the heat therefrom is partly baffled by the side walls of the channel and by the blocks 11 as clearly shown in Fig. 4. This will prevent passage of heat from the heating elements directly into the forehearth channel and will assure distribution of heat along the exterior of the channel walls in each of the aforesaid compartments of the jacketed heating space.

Figure 1:
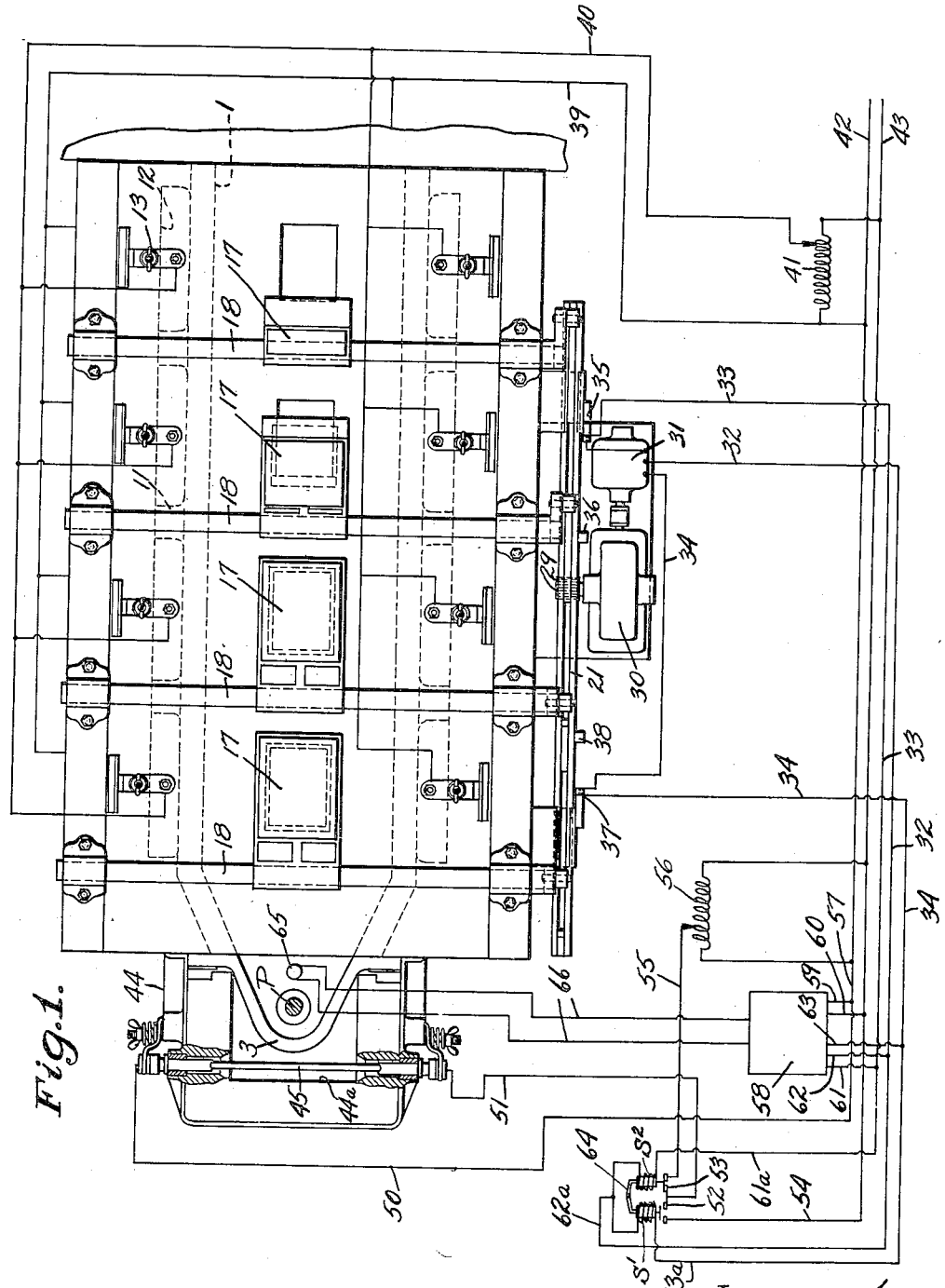
Figure 1 is a plan view of a forehearth equipped with temperature control means embodying structural features of the invention, parts of such structure being shown diagrammatically and certain parts of the complete structure being omitted and other parts being partially broken away in order to disclose underlying parts.

The aforesaid electrical heating bars 13 are connected at their upper and lower ends by branch wires shown in Fig. 1 with the electrical conductors 39 and 40 which in turn are connected electrically through the adjustable autotransformer 41 with the power lines 42 and 43 which may be connected with any suitable source of electric current supply. The connections of the wires 39 and 40 with the respective electrical heating elements may be in parallel and the auto transformer may be adjusted to vary the amount of current supplied to the heating elements and consequently the amount of heat introduced into the space which surrounds the refractory glass conducting channel 1.

The portion of the top member 7 above the channel 1 preferably is enlarged downwardly for part of its width as indicated at 15 so that relatively greater space is provided for the reception of heated gases above the side portions of the glass in the channel than above the longitudinal median portion thereof. This construction also will serve to prevent direct radiation of heat from such side portions of the glass stream through the longitudinally spaced heat radiation openings 16 that are provided through the cover members 7 and 7a above the longitudinal median line of the glass channel.

Each of these openings 16 is provided with a shutter or shield 17, made of refractory material, and mounted on a suitable carrying arm or holder 17a to swing about the axis of a rock shaft 18 to and from position completely to cover the upper end of its associated opening 16. Each of the rock shafts 18 is shown as extending transversely across the top of the forehearth structure and is provided at one end with a crank or rocker arm 19. A roller 20 preferably is provided at the free end of such crank or rocker arm. These rocker arms are disposed in line longitudinally of the forehearth structure at one side of the latter and above a longitudinally reciprocable slide bar 21 which is supported at spaced points by the guiding and supporting brackets 22 on the side of the forehearth structure. The slide bar 21 carries shutter actuator or control blocks 23, 24, 25 and 26, respectively, there being a block disposed in position to cooperate with each of the rocker arms to produce the desired opening and closing movement of the associated shutter when the slide bar is reciprocated. The positions of the respective blocks on the slide bar preferably are adjustable along the length of such slide bar, as by making the slide bar in juxtaposed longitudinal sections as shown in the detail view (Fig. 6) and by providing slots in the portions of the blocks that are received between such sections of the bar as shown for the blocks 25, 24 and 23, in Fig. 2, screws 27 being employed to connect the blocks to the sections of the slide bar and such connections permitting adjustment of the blocks when the screws extend through slots in the blocks as shown for the blocks 25, 24 and 23 in Fig. 2. The lengths of the respective blocks on the slide bar are shown as being graduated with respect to one another and to their relative positions on the slide bar so that a given longitudinal movement of the bar 21 toward the right from a position in which all blocks are out of contact with their associate rocker arms 19 will cause the shutters 17 to be raised in sequence, the shutter nearest to the furnace being the first one raised. In the position of the slide bar shown in Fig. 2, the shutter 17 nearest to the furnace is almost completely raised, the shutter next in line has been raised to a less degree while the block 25 is about to engage the rocker arm for the third shutter from the furnace and the block 26 for engaging the rocker arm for the shutter nearest to the delivery end of the forehearth is still a considerable distance away from such rocker arm. The blocks may have their corner portions next to their associate rocker arms beveled, as indicated at 26a, 25a, 24a and 23a, respectively, and it is obvious that differential raising and lowering movements of the respective shutters may be produced by varying the character of the respective beveled portions of the individual blocks, such adjustment being in addition to the control by variation of the positions and lengths of the respective blocks. On the return movement of the side block, the shutters will be closed in reverse order, this being occasioned by the difference in the lengths of the respective blocks and in view of their respective positions on the slide bar, the shutter nearest to the delivery point being the first to be closed and the remaining shutters being closed in sequence.

The reciprocatory movements of the bar 21 may be effected by providing rack teeth 28 in the lower edge portion of such bar in mesh with a pinion 29 (Fig. 1) on the driven shaft of a speed reduction unit 30. A reversible motor 31 has its drive shaft operatively coupled with the speed reduction unit 30. The motor 31 will be operated to move the bar 21 toward the right from the position shown in Figs. 1 and 2, that is, in the direction to cause opening of the shutters when a circuit including the wires 32 and 33 is closed. The return movement of the bar 21 to effect closing of the shutters will be effected by the operation of the motor 31 when a circuit including the wires 32 and 34 is closed. A stop switch 35 will be actuated by an abutment 36 on the slide bar on a maximum movement of the latter toward the right to open the circuit that includes the wires 32 and 33 and thereby to prevent further movement of the bar 21 in that direction. Similarly, a limit switch 37 in the circuit that includes the wires 32 and 34 will be actuated by an abutment 38 on the bar 21 on a maximum return movement of the bar when the shutters have been completely closed so as to open the motor circuit and to prevent further movement of the bar to the left.

The manner in which the circuits for controlling the operation of the reversible motor 31 are controlled will be presently described.

The delivery end portion of the glass conducting member is surrounded by a heat confining structure 44 which is appurtenant to and may be an extension of the heat confining jacket and insulating structure about the channel 1. The delivery end portion 3 of the glass conducting channel is shown in Fig. 2 as being surrounded at its top, sides, front, and part of its bottom by a heating space 44a in the heat confining structure 44. Electrical heating elements, such as those indicated at 45, preferably are mounted to extend across such heating space as clearly shown in Figs. 1 and 2. The heating space 44a may be and preferably is practically separated from the heating space of the heat confining jacket for the channel 1.

The heat confining structure about the delivery end portion of the glass conducting channel has a suitable opening in its top wall for accommodating the glass discharge regulating member P when such glass delivery portion is a feed spout, as shown. The bottom of such heat confining structure also is provided with a suitable opening into which the delivery outlet of the spout may depend and through which glass may issue for the formation of suitable mold charges. To aid in producing mold charges of desirable temperature and viscosity condition in suspension below the outlet, an open bottomed annular heat confining member 46 may be secured, as by means of the lugs 47 on the casing portion thereof, to the bottom of the heat confining structure 44. Such member 46 is provided on its inner periphery with electrical heating ribbon 48, arranged as shown, so that the glass depending from the outlet and accumulating in suspension will be subjected to radiant heat and a heated envelope will be maintained around such glass. The lower end portion of the refractory lining of the member 46 has its inner wall inclined inwardly and downwardly as indicated at 46a so as partly to baffle the heat from the element 48 and to reflect or radiate heat upwardly and inwardly toward the glass delivery outlet. Suitable openings, as indicated at 49, may be provided in the member 46 for the entrance and withdrawal of suitable shear blades, not shown, for severing the formed charges from the glass at the outlet.

The heat from the electrical heating elements on the inner periphery of the member 46 will be effective to maintain desirable temperature and viscosity conditions in the glass issuing from the outlet and accumulating in suspension below the outlet and also to cause reheating of the glass stub after each shearing operation so as to prevent objectionable chill or shear marks in the article that is subsequently fabricated from such charge. The means for supplying electric current to the resistance ribbon 48 is not shown but any suitable electrical conducting means and connections may be employed.

The electrical heating bars 45 for locally heating the space about the glass in the feed spout or delivery end of the channel 1 are connected electrically with an automatic control mechanism that will act in response to departures from normal of the temperature in the glass adjacent to the delivery point not only to vary the amount of the electric current supplied to the heating elements 45 but also to control the operation of the motor 31 so that the shutters 17 will be progressively opened or closed. The change of the heating effect on the glass from the members 45 will quickly cause a corrective adjustment of the glass at the delivery point and the opening or closing of a shutter or shutters 17 will cause a corrective adjustment of the temperature of the glass passing along the forehearth channel toward the delivery point. To this end, one end of each of the heating bars 45 is connected by a conductor 50 with one of the leads, as the lead wire 42. The other end of each of the electrical heating elements 45 is connected by a conductor 51 with contacts 52 and 53 which are common to a pair of relay switches indicated generally at S—1 and S—2, respectively, Fig. 1. The other contact of the switch S—1 is connected by a conductor 54 with the second lead wire, as the lead wire 43, whereby when the switch S—1 is closed, the electric circuit for energizing the heating elements 45 will be directly from the lead wires and therefore a maximum heating effect will be obtained with a given current available. The second contact of the switch S—2 is connected by a conductor 55 with the adjustable side of an auto-transformer 56. The auto-transformer 56 is operatively connected with the lead wires 42 and 43 and the terminal of the auto transformer which cooperates with the adjustable terminal of the wire 55 is connected, as indicated at 57, with the conductor 50, whereby when the switch S—2 is closed, the heating bars 45 will be energized by a circuit which includes the auto-transformer 56. The amount of current that then will be supplied to the heating elements 45 therefore will be less than when the switch S—1 is closed and will be regulably predetermined by the adjustment of the auto-transformer 56.

The switches S—1 and S—2 are controlled electrically from a control pyrometer 58, Fig. 1, which is shown diagrammatically as it may be of a conventional construction. This pyrometer also controls the operating circuits for the reversible motor 31. As shown, the pyrometer 58 is operatively connected with the lead wires 42 and 43 by conductors 59 and 60, respectively. The pyrometer also is provided with the three wires indicated respectively at 61, 62 and 63. The circuit for closing the related switch S—1 comprises branches 62a and 63a of the pyrometer wires 62 and 63, respectively, while the circuit for closing the relay switch S—2 comprises the branch wire 62a and a branch wire 61a of the pyrometer wire 61, the branch wire 62a thus being common to the two relay closing circuits. The movable contact members of the two relay switches S—2 are operatively connected, as by means of the intermediately pivoted double throw switch arm 64 so that closing of either of these switches will cause opening of the other switch.

The wires 33, 32 and 34, hereinbefore referred to as being connected electrically with the reversible motor 31, also constitute branches of the pyrometer wires 61, 62 and 63, respectively. When the circuit for operating the motor 31 in the direction required to effect opening movement of the shutters is closed by operation of the pyrometer, the circuit which includes the wires 62a and 61a for closing the relay switch S—2 also will be closed so that electric current will be supplied to the heating elements 45 through the adjustable auto-transformer 56 and consequently the heating of the glass adjacent to the delivery point will be decreased or relatively more heat will be permitted to escape from such glass while the heat permitted to radiate from the glass passing along the channel to the delivery point will be increased. When the pyrometer acts to close the motor operating circuit that includes the wires 32 and 34 so that the direction of movement of the slide bar 21 will be to the left in Fig. 2 for the purpose of closing the shutters 17, such operation of the pyrometer also will close the circuit which includes the wires 62a and 63a for closing the relay switch S—1. This will cause electric current to flow to the heating elements 45 direct from the leads 42 and 43 so that the heating of the glass at the delivery point will be increased or less heat will be permitted to escape at the place of delivery and the closing of the shutters will decrease the amount of heat radiation permitted from the glass flowing along the channel to the place of delivery.

The pyrometer 58 may be of the type, readily obtainable as a unit, which closes periodically either of the aforesaid two circuits which it controls, the intervals between such circuit closing operations being determined by a timer that is contained within the pyrometer unit. That is, the pyrometer may act at predetermined regular intervals to close repeatedly either the circuit which includes the wires 62 and 63 or the circuit which includes the wires 62 and 61, or to close the respective circuits alternately, according to the character of the control of such pyrometer that is being exercised by a thermostatic control member at the time of such circuit closing operations of the pyrometer. That is, so long as the pyrometer control member is actuated by a temperature higher than a predetermined temperature, the periodic operations of the pyrometer will close repeatedly the circuit which includes the wires 62 and 61. After the temperature to which the pyrometer control member is subjected drops below the predetermined temperature, the periodic operations of the pyrometer will close the second control led circuit until the temperature has risen above the predetermined temperature. The thermostatic control of the pyrometer may be obtained by the use of a thermo-couple 65, Figs. 1 and 2, which depends into the glass adjacent to the delivery point and is operatively connected electrically by the conductors 66 with the pyrometer. The portion of the thermo-couple that is exposed to the deleterious effect of the molten glass in the forehearth may be protected in any suitable known manner, as by a casing of refractory material.

From the foregoing description of the various parts of a structure embodying the invention, the operation thereof may be readily understood. The pyrometer will function under the control of the thermo-couple 65 to close periodically the circuit for closing the relay switch S—1 and for operating the motor 31 to close the shutters when the temperature of the glass adjacent to the feed outlet or place of delivery is below a predetermined temperature and also will function to close the relay switch S—2 and to operate the motor in the reverse direction or in the direction required to open the shutters 17 when the temperature of the glass at or adjacent to the delivery point rises above such predetermined temperature, which is the temperature at which it is desired to feed or deliver the glass. The current supply is selected and the auto-transformer 41 is adjusted so that heat slightly in excess of that which otherwise would be dissipated by radiation through the walls of the container 11 is supplied by the heating elements 13 to the glass conducting channel and to the glass therein. As aforesaid, the glass entering the channel 11 from the melting tank usually is at a temperature slightly higher than that at which it is desirable to feed or deliver glass for subsequent fabrication. The application of heat to the glass conducting channel and the regulation of the temperature of the glass by permitting radiation of a regulable amount of heat through openings above the longitudinal median portion of the glass in the channel will effectually prevent channeling and will provide delivery of glass of substantially uniform temperature and viscosity throughout the width of the channel 11. Assuming that the shutters 17 have been adjusted and that the heat supplied to the glass conducting channel from the heating members 13 has been adjusted so that with glass of a given temperature entering the channel, such glass will reach the delivery point at approximately the temperature desired, any departure downwardly from this temperature will cause the periodic operations of the pyrometer to close the switch for permitting an increased heating effect by the heating elements 45 at the delivery point and will close the motor operating circuit to effect a closing movement of the shutters 17. Similarly, an increase of temperature at the delivery point above the desirable temperature will cause the periodic operations of the pyrometer to close the switch for causing a decreased heating effect by the heating members 45 at the place of delivery and a closing of the motor operating circuit to effect opening movement of one or more of the shuters 17. In actual practice, there is a continuous fluctuation of temperature in the glass at the delivery point of a forehearth and the operation of the improved control mechanism just described will utilize such fluctuation to produce a practically balanced temperature condition at the delivery point by keeping upward and downward variations of temperature from that desired within unobjectionable and relatively narrow limits. Any departure in temperature from that desired at the delivery point will cause a quickly acting corrective adjustment of heat at such delivery point with a view to restoring the proper temperature at such delivery point before very much glass has been fed or otherwise delivered at an improper temperature. Coincidently with this quickly applied local correction, movement of one or more of the shutters toward open or closed position will be effected to adjust the radiation of heat permitted from the glass in the conducting channel so that the temperature of the glass being supplied at the delivery point likewise will be adjusted. It is desirable that the adjustment of the temperature of the glass passing to the delivery point shall be effected with a minimum of disturbance of the glass at the delivery point and so that, after a cooling action on such glass, some time will be allowed for reheating and homogenizing of the glass as it flows to the delivery point. With this object in view, the shutter remote from the delivery point preferably is opened first and to the greatest extent. The other shutters preferably are opened in sequence so that the shutter nearest to the delivery point will be the last one to be opened should a relatively great decrease of temperature of glass at the delivery point be required. On a lowering of the temperature below that desired, the shutters preferably are closed in reverse order. That is, the shutter nearest to the delivery point is closed first. The relative times of opening and the extents of opening movements of the respective shutters for a given longitudinal movement of the shutter operating bar 21 may be adjusted within limits, as by adjusting the blocks along the slide bar or by adjusting the length and character of the contact or working faces of the respective blocks. It also is obvious that the shutter arms may be secured to the rock shafts 18 by set screws, not shown, or in any other suitable manner so that each of such shutters may be angularly adjusted about the axis of its rock shaft and a relative adjustment of the shutters thus may be obtained. The intervals between the periodic circuit closing operations of the pyrometer preferably are of sufficient duration to permit the effect of each adjustment of radiation of heat from the channel to be registered at the delivery point before the next adjustment. This will tend to prevent overadjustment of the temperature of the glass flowing to the delivery point.

In the construction shown in Fig. 7, heat is applied to the compartments of the space between the glass conducting channel 1 and its heat confining casing from burners 70 which are shown as being adapted to discharge through suitable burner openings 71 at the bottoms of the side portions of such spaces. The construction of the walls of the casing adjacent to the burners of course may be changed in any suitable known manner from that shown in Fig. 3 to accommodate the burners instead of the electrical heating elements. Part of the gases of combustion may be permitted to escape above the side portions of the heating compartments as through the openings 72. These openings 72 may be covered completely or partly by refractory blocks 73 or otherwise controlled so as to aid in regulably controlling temperature and draft conditions in the respective compartments of the jacketed heating space surrounding the channel. In other respects, the construction shown in Fig. 7 is substantially the same as the form of construction shown in the preceding figures and hereinbefore described in detail. The same reference characters have been used to designate like parts and therefore no further description of the construction of the form of the device shown in Fig. 7 is deemed necessary herein. The operation of the modified form of the device will be substantially the same as that hereinbefore described for the form of construction shown in the preceding views.

The invention may be modified in many ways to adapt such invention to different uses or different conditions of service without departing from the spirit and scope of such invention as set out in the appended claims.

I claim:

1. The combination with a refractory channel for conducting molten glass from a melting tank or like source of supply to a place of delivery of glass, of means for heating said refractory channel externally both at its sides and its bottom to prevent appreciable loss of heat from the glass through the walls of the channel, and means for controlling the temperature of the glass in said channel by controlling the upward radiation of heat from such glass.

2. The combination with a refractory channel for receiving molten glass at one end of said channel and for conducting said glass to a place of delivery adjacent to the opposite end of the channel, of means for heating said channel externally both at its sides and its bottom to prevent appreciable loss of heat from the glass through the walls of said channel, and a series of control means above the longitudinal median line of the glass in the channel for effecting differential regulation of upward radiation of heat from the glass at different places along the length of the channel.

3. The combination with a refractory channel for receiving molten glass at one end of said channel and for conducting said molten glass to a place of delivery adjacent to the opposite end of the channel, of a plurality of separate means for applying heat to the exterior of said channel at a plurality of different places along the length of said channel, a plurality of separate means for controlling the upward radiation of heat from the glass in the channel at a plurality of different places along the length of said channel, and means responsive to a variation in temperature of the glass adjacent to said delivery point for actuating said radiation control means in a predetermined order and each to an individually controllable extent.

4. The combination with a refractory channel for flowing molten glass from a source of supply at one end of said channel to a delivery point adjacent to the opposite end of said channel, of a jacket surrounding the walls of said channel and cooperating therewith to provide a heating space surrounding the sides and bottom of said channel, means for introducing a regulable amount of heat into said heating space, a cover for said channel having a plurality of spaced heat radiation openings therein above the longitudinal median portion of the glass in said channel, individual shutters for said heat radiation openings, and automatic means responsive to variations in the temperature of the glass adjacent to said delivery point for operating said shutters in a predetermined order and to predetermined extents.

5. The combination with a refractory channel for flowing molten glass from a source of supply at one end of said channel to a delivery point adjacent to the opposite end of said channel, of a jacket surrounding the walls of said channel and cooperating therewith to provide a heating space surrounding the sides and bottom of said channel, means for introducing a regulable amount of heat into said heating space, a cover for said channel having a plurality of spaced heat radiation openings therein above the longitudinal median portion of the glass in said channel, individual shutters for said heat radiation openings, and means operable on increase of temperature of the glass adjacent to the delivery point above a predetermined temperature to open said shutters in a predetermined order and on a decrease of temperature in the glass adjacent to said delivery point below said predetermined temperature to close said shutters in a reversed order.

6. The combination with a refractory channel for conducting molten glass from a source of supply at one end of said channel to a point of delivery adjacent to the opposite end of said channel, of a cover for said channel having a series of spaced heat radiation openings therein above the longitudinal median portion of the glass in said channel, a shutter for each of said openings, means responsive to rise of temperature of the glass adjacent to said delivery from a predetermined temperature to progressively open said shutters in sequence, beginning with the shutter nearest to the source of supply, and operable on decrease of temperature in the glass adjacent to said delivery point below said predetermined temperature to progressively close said shutters in a reversed order.

7. The combination with a refractory channel adapted to receive molten glass from a source of supply at one end thereof and having a delivery portion at its outer end, of a heat confining structure surrounding said delivery end portion of said channel, means for introducing a temperature modifying medium into said heat confining structure, and automatic means responsive to variations of temperature of the glass in said delivery end portion for controlling said temperature modifying medium introducing means to vary the delivery of temperature modifying medium into said structure.

8. The combination with a refractory channel for receiving molten glass from a source of supply at one end of the channel and for conducting such glass to a delivery point adjacent to the opposite end of the channel, of a heat confining structure enclosing said channel and having a top member constituting a cover for said channel, the side and bottom walls of said heat confining structure being spaced at places from the side and bottom walls of said jacket to provide a longitudinal series of separate heating spaces at the bottom and sides of said channel, means for introducing heat into each of said heating compartments, and means for regulating the effective action of said heat supply means.

9. The combination with a refractory channel along which molten glass may flow from a source of supply, of a refractory cover for said channel, said cover having a series of heat radiation openings therein above the longitudinal median portion of the glass in the channel, a separately mounted pivoted shutter for each of said heat radiation openings, a movable actuator adjacent to said channel, and separate independently adjustable members carried by said actuator for controlling the opening and closing movements of said shutters in response to operating movements of said actuator.

10. The combination with a refractory channel along which molten glass may flow from a source of supply, of a refractory cover for said channel, said cover having a series of heat radiation openings therein above the longitudinal median portion of the glass in the channel, a separately mounted pivoted shutter for each of said heat radiation openings, a movable actuator adjacent to said channel, separate independently adjustable members carried by said actuator for controlling the opening and closing movements of said shutters in response to operating movements of said actuator, means responsive to variations in temperature of the glass adjacent to the outer end of said channel for automatically operating said actuator to effect opening movements of said shutters when said temperature in the glass rises above a predetermined point and for operating said actuator to effect closing movements of said shutters when said temperature falls below said predetermined point.

11. The combination with a refractory channel for receiving molten glass from a source of supply at one end of said channel and along which such glass may flow, a series of temperature control means extending along said channel for regulating the temperature of the glass at different places along said channel, and automatic means for operating said control means in a predetermined order and each to a predetermined extent according to the variation from a predetermined temperature of the glass at a given place in said channel.

12. The combination with a refractory channel through which molten glass may flow from a source of supply, of a cover for said channel, said cover having a series of spaced heat radiation openings above the longitudinal median portion of the glass therein, a separately mounted pivoted shutter for each of said openings, a reciprocable slide bar adjacent to said channel, independently adjustable individual blocks on said slide bar for the respective shutters, individual means connected with said pivoted shutters in positions to actuate the respective shutters in a predetermined order to effect opening movements of the shutters on movement of said slide bar in one direction and to effect closing movements of the shutters in a reverse order on a return movement of said slide bar, a reversible motor connected to reciprocate said slide bar, and thermal responsive electrical means for controlling the operations of said motor according to departures in temperature above and below a predetermined temperature of the glass at a predetermined place in said channel.

13. The combination with a refractory channel for receiving molten glass from a source of supply at one end of said channel and for conducting such glass to a delivery point adjacent to the opposite end of the channel, means for heating said channel to prevent appreciable loss of heat from the glass through the walls of said channel, means for supplying heat adjacent to the outer end of said channel for locally controlling the temperature of the glass at the delivery point, means for controlling the upward radiation of heat from the glass in said channel, and means responsive to a rise in temperature in the glass adjacent to said delivery point to actuate said last named heating means to reduce the heat supplied thereby and simultaneously to actuate said radiation control means to permit increased radiation from the glass and operable on a decrease of temperature in the glass adjacent to said delivery point to actuate said last named heating means to cause an increase in the heat supplied thereby and to actuate said radiation control means to decrease the heat radiation from the glass in the channel.

14. A refractory channel for receiving molten glass from a source of supply at one end of said channel, said channel having a delivery portion at the outer end thereof, heat confining means surrounding said channel and said delivery portion and cooperating therewith to provide heating spaces extending across the bottom and at the sides of the channel and surrounding the delivery portion of said channel, means for supplying heat to the delivery space at the sides and bottom of said channel, electrical means for supplying heat to the heating space surrounding the delivery end portion of said channel, said heat confining means including a top wall for said channel having a series of heat radiation openings disposed above the longitudinal median portion of the glass in said channel, separately mounted pivoted shutters for controlling said heat radiation openings, a thermostatic control member adjacent to the glass in the delivery portion of said channel, a reversible motor connected to raise and lower said shutters, electrical circuits for operating said reversible motor in opposite directions, and means controlled by said thermostatic member for controlling said motor operating circuits and said electrical heating means.

15. The combination with a forehearth having a channel along which molten glass may flow from a source of supply to a downwardly opening discharge outlet adjacent to the outer end of said channel, means for controlling the temperature of the glass as it flows along said channel to said discharge outlet, an open bottomed annular hood depending from the outer end of said channel in concentric relation with said discharge outlet, said hood having a refractory lining formed adjacent to the lower end thereof to provide a downwardly and inwardly inclined baffle for reflecting and radiating heat upwardly toward the discharge outlet, and an electrical heating element extending around the inner periphery of said refractory lining of the hood above said baffle.

16. The method which comprises flowing molten glass in a refractory channel from a source of supply at one end of said channel to a place of delivery of glass from the channel and controlling the temperature of the glass at said place of delivery by heating the walls of said channel externally both at its sides and its bottom to prevent appreciable loss of heat from the glass through said walls and regulating the radiation of heat upwardly from said glass as it flows along the channel toward said place of delivery.

17. The method which comprises flowing molten glass in a refractory channel from a source of supply at one end of a refractory channel to a place of delivery of glass from the channel, heating the walls of said channel externally both at its sides and its bottom to prevent appreciable loss of heat from the glass through said walls, and regulating the radiation of heat upwardly from said glass to predetermined extents and at different times at different places along the length of said channel.

WILLIAM T. HONISS.